United States Patent Office 3,488,821
Patented Jan. 13, 1970

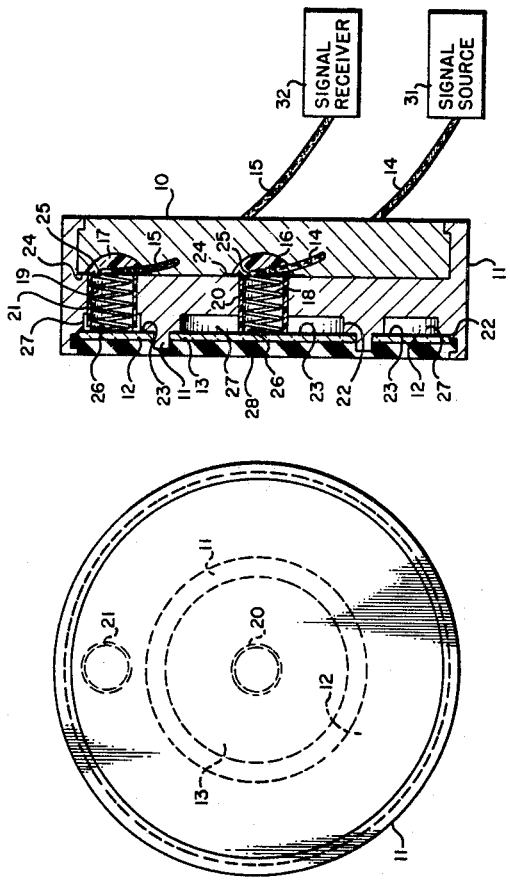
INVENTOR
JAMES R. RICHARDS
ATTORNEY

3,488,821
METHOD OF MANUFACTURING A HIGHLY SENSITIVE FETAL HEART TRANSDUCER
James R. Richards, 2813 63rd Ave.,
Cheverly, Md. 20785
Original application Jan. 8, 1965, Ser. No. 424,446, now Patent No. 3,379,901. Divided and this application Sept. 27, 1967, Ser. No. 671,159
Int. Cl. G01r 3/00; H04r 31/00
U.S. Cl. 29—25.35                          4 Claims

ABSTRACT OF THE DISCLOSURE

A method of transducer manufacture which utilizes a low temperature metal melt to completely encapsulate the shielded transducer leads so as to achieve relatively complete isolation between transmit and receive channels of the transducer.

STATEMENT OF GOVERNMENT INTEREST

The invention described, herein, may be manufactured and used by or for the Government of the United States for governmental purposes without the payment of any royalties, thereon, or therefor.

CROSS REFERENCE TO RELATED APPLICATION

This application is a division of application, Ser. No. 424,446, filed Jan. 8, 1965, now Patent No. 3,379,901, for "Fetal Heart Transducer and Method of Manufacture."

BACKGROUND OF THE INVENTION

The present invention relates to a method of manufacture of ultrasonic Doppler transducers and more particularly to a unique method of manufacture of ultrasonic Doppler transducers wherein complete encapsulation of the shielded transducer leads provides almost complete isolation between the channels represented by these respective leads so that the transducer is capable of being used in the detection of the fetal heart.

The Doppler transducer is a device capable of transmitting a signal into a liquid or semisolid media, receiving the reflected signal from the media and being sensitive to minute changes in the frequency of the signal occasioned by the movement of the object being observed. The movement of the object toward the transducer causes cycles to be added to the signal reflected from the object, while movement away from the transducer results in cycles being subtracted from the signal reflected in proportion to the rate of movement of the object. This phenomenon is known as Doppler frequency shift and is widely used in such areas as radar and sonar detection systems.

More recently, in an article in the American Heart Journal, Analysis of Heart Motion with Ultrasonic Doppler Method and Its Clinical Application, by Yoshida et al., January 1961, there is noted the application of Doppler frequency shift utilizing ultrasound in the analysis of heart motion. This article describes the transmission of ultrasound into the living body and reflection of the signal from the boundary between two living tissues having different sound impedance. For example, in the heart, the ultrasound is partially reflected from the outer surface and inner surface of the heart wall, and from the valves.

Unfortunately, the American Heart Journal article and other prior art teachings of ultrasound techniques in clinical application fail to direct themselves specifically to the problems inherent in fetal heart detection. The application of ultrasound to obtain information about the fetal heart presents ancillary problems of interference in the form of noise generated by the mother and an exceptionally weak return signal due to the small size of the target.

SUMMARY OF THE INVENTION

The general purpose of the present invention is to provide a unique method of manufacture of an ultrasonic Doppler transducer specifically adapted to fetal heart detection. This transducer possesses all of the advantages of prior art transducers utilizing the Doppler frequency shift phenomenon, while possessing extremely high sensitivity due to relatively complete isolation between the transmit and receive channels of the transducer. Because the amplitude ratio between transmitted and received signals is on the order of 30,000,000 to 1, electrical isolation of this magnitude is essential to detect the weak return from the fetal heart. The novel method of transducer manufacture, which is the subject matter of this invention, utilizes a low temperature metal melt poured over the shielding of the input and output wires of the transducer, and is responsible for achieving the high degree of isolation acquired.

It is, accordingly, an object of the present invention to provide a method of transducer manufacture utilizing a low temperature metal melt to cover the transducer leads thereby achieving relatively complete isolation between transmit and receive channels.

Other objects and advantages of the invention will become more fully apparent and better understood from the following description of a preferred embodiment of the transducer which is manufactured by the method of the invention, as illustrated in the accompanying drawings.

BRIEF DESCRIPTION OF THE DRAWINGS

FIG. 1 shows a cutaway side view of an illustrative embodiment of the transducer; and FIG. 2 shows a front face view of the transducer shown in FIG. 1.

DESCRIPTION OF THE PREFERRED EMBODIMENTS

Referring now to the drawings, there is shown a pair of crystals 12 and 13 held in concentric relation by the supporting case structure 11 of the transducer. Springs 18 and 19 form biased electrodes making electrical contact with the coated back surface of the respective crystals. These spring electrodes are isolated from the metallic case structure by insulation sleevings 20 and 21, while the back face of each crystal is insulated from the case by insulation means 23. The insulation covering 23 is perforated to permit contact between the electrode and the crystal. Shielded leads 14 and 15 are shown with the center conductor of each making electrical contact to the signal source 31 and to the signal receiver 32, respectively; and to the respective electrodes 18 and 19. This electrode-wire connection is shown as a solder connection 25 and the connection between the electrode and the crystal is shown as a solder connection 26. Insulation means 24 cover the spring electrode chambers at the back end and have a hole punched therethrough to allow the wires from the shielded leads to make contact with the electrodes. This insulation serves as both a retaining means to hold the spring electrode in place and provides electrical insulation sealing off the electrode chambers from the rest of the transducer. Insulation means 16 and 17, in the form of epoxy cement, mechanically bonds and in addition insulates each of the shielded wires at the point of connection with the electrodes. The shields of the wires 14 and 15 are shown in FIG. 1, embedded in a metallic block 10, which in the novel method of manufacture of the transducer comprises a metal in the molten state at the time of application to the shields of these wires and is poured into the cavity formed by the case of the transducer 11 to insure a common electrical ground connection between the shields of these wires and the metallic case 11.

The elastomeric coating 28 shown in FIG. 1, is a multi-purpose element of the transducer. This coating, which may be silicon rubber, for example, provides protection for the crystals and acts as a face plate for the transducer, providing acoustic coupling between the crystals and the medium in which the detection measurement is to be made. This elastomeric coating performs still another function, that of allowing a small amount of acoustic coupling between the transmitted and received signals, such that the signal to the external receiving apparatus is mixed with a fraction of the transmitted signal, and thus the need for mixing the received and transmitted signals is obviated. This added feature eliminates the necessity of coupling a portion of the transmitted signal into an external mixing circuit, which coupling by necessity limits the sensitivity of the system. Also shown in FIG. 1 is a cavity 27 in the transducer case immediately behind each crystal. These cavities may contain any suitable material such as air or oil to provide a cushion, in the form of mechanical resilient support, and acoustic coupling for the crystals.

The transducer made by the method of the present invention has many advantages not readily apparent in the drawing, nor easily ascertained from the description of the elements and their structural relationship.

The crystals, it may be noted, are cemented to the case 11 only at the outer edge 22 thereof. Being permanently affixed to the shell only at this outer extremity, the crystals are thus provided with a high degree of freedom for vibration in the thickness mode. Also, while not shown, each crystal is coated on both faces thereof with an electrically conductive material suitable for contact purposes, such as gold or silver. While the back face of each crystal makes electrical contact with the spring electrodes 18 and 19, the front face of each crystal is grounded to the case 11. In FIG. 1, the insulation sleeving 20 and 21 about each electrode is shown to be displaced a small amount from the back face of each crystal. This insulation means is of a resilient material. The sleeving displacement from the crystals and the material chosen is for the purpose of avoiding any restraint of crystal vibration.

While the electrodes 18 and 19 have been described as being connected by solder means to the crystals, spring contact is suitable and often the only practical means of obtaining electrical connection at this point.

In the illustration shown in the drawings the pair of crystals in the transducer are shown to be of such size and shape as to be suitable to a coaxial relationship, the center crystal being in the form of a disc while the outer crystal is in the form of a flat ring. While the coaxial relationship is most ideal for use in fetal heart detection due to the enhanced sensitivity of reception provided by the encircling receiver crystal, this particular configuration is by no means intended to limit the application of the unique features of the present invention.

In the sample transducers tested the crystals were X-cut quartz chosen because of the high Q of this crystal and the particular feature of this cut, vibration in the thickness mode. These two features are most ideal for the detection of extremely weak signals, but any suitable piezoelectric crystal would suffice.

If the transducer made by the method of the present invention is used to detect fetal heart movement by the application of ultrasound and Doppler detection techniques, the unique features of the transducer manufactured by the method of the present invention will become readily understandable. In this application, recognizable signal return is limited by the threshold of body sensitivity to ultrasound, thus limiting the maximum signal transmitted into the mother. Also, the noise generated by the mother's body creates background noise inhibiting detection. In addition, the weak signal reflected by the small fetal heart further complicates successful monitoring of this object. With any appreciable leakage of electrical signal from the transmitting channel of the transducer to the receiving channel, therefore, fetal heart monitoring would be impossible. For example, with a 30 volt signal into the transmitting crystal of the transducer, signal returns as low as 1 microvolt reflected from the fetal heart are not uncommon. The degree of isolation required between the transmit and receive channels of the transducer is thus extremely demanding. It will be appreciated that electrical leakage in the order of 1 microvolt cannot be tolerated. Thus, it is the unique method of channel isolation, which is the subject matter of the present invention, that has made fetal heart detection possible.

Referring again to FIG. 1, the shields of the transducer leads 14 and 15 are shown embedded in the metallic material 10. This complete encapsulation of the shielded leads provides the nearly complete isolation between the channels represented by these respective leads. In the method of manufacturing the transducer, this isolation is achieved by pouring a low temperature melt metallic compound directly onto the leads so as to fill the cavity defined by the case 11 until that portion of the leads within this cavity not covered by the epoxy insulated means 16 and 17 are completely immersed and encapsulated by this metallic melt. The shields of the leads are thus electrically in common with each other and the metallic case of the transducer and the transmit and receive channels of the transducer are afforded nearly complete isolation.

It should be noted that the melting temperature of the metallic melt covering the shielded leads must be lower than the melting temperature of any of the other elements of the transducer with which it makes contact. This is to insure that the hot metal will not damage any of the other parts of the transducer.

The isolating material poured over the shielded transducer leads is not limited to a metal. The essential requirement of this material is electrical conductivity. Thus, any material having a melting temperature lower than the elements of the transducer with which it makes contact can provide the electrical shielding necessary if the material in its solid form is an electrical conductor. An epoxy resin containing a colloidal suspension of a conducting metal, for example, provides the desired characteristics.

While the dimension and shape of the crystals in the transducer have been generally described above, it should be pointed out that piston-type vibration is required for the proper functioning of the transducer of the present invention. This requires a crystal that vibrates in its thickness mode, a characteristic of X-cut piezoelectric crystals. The thickness of such a crystal determines the frequency at which the transducer can transmit and receive; and conversely, the desired frequency of the signal to be passed by the transducer determines the thickness of the crystal. A sample transducer operating at 6 megacycles will have X-cut quartz crystals 0.48 millimeter thick. The thickness of the crystal varies as an inverse function of the frequency of the signal passed.

A coaxial transducer is most sensitive when detecting the return from a small object such as a fetal heart when the center crystal of the transducer is used for transmitting and the outer crystal is used for receiving. This mode of operation is desirable because of the more directive beam transmitted from the smaller center crystal and the more inclusive reception obtained from the peripheral pickup of the outer crystal. The transducer of the present invention is not intended, however, to be limited in use to fetal heart monitoring. This transducer has application wherever the movement of an extremely small object is to be monitored. Moreover, when the object to be detected is not so restricted in size, it may be desirable to utilize the outer crystal for transmitting and the inner crystal for receiving.

Due to its high sensitivity the transducer made by the method of the present invention readily lends itself to the detection of minute movements of a subject. This transducer may be used in analysing the characteristic movement of blood vessels. As the elasticity of the vessel wall changes with age or due to other factors, such infirmities as hardening of the arteries can be more readily detected. By monitoring the capillary action of the blood in the fingertips, for example, early detection of arteriosclerosis is made possible.

A general indication of the operation of the circulatory system may be obtained by utilizing a pair of transducers. With one transducer placed over the heart and another at the end of an extremity, a ballistic cardiograph may be obtained, wherein the time between the initiation of a heart beat and the arrival of the ballistic wave at the extremity is measured.

Since there is an indicated relationship between blood pressure and walled velocity of a blood vessel, the transducer made by the method of the present invention has use in the remote monitoring of an astronaut's blood pressure during flight. The changing picture of the blood vessels can be constantly transmitted and compared with a before-flight picture. The transducer made by the method of the present invention is also useful in the testing of drugs. The reaction of a chicken embryo to different drugs, for example, can be monitored by detecting changes in the heart beat.

Since various changes and modifications may be made in the practice of the invention herein described without departing from the spirit or scope thereof, it is intended that the foregoing description shall be taken primarily by way of illustration and not in limitation except as may be required by the appended claims.

What is claimed and desired to be secured by Letters Patent of the United States is:

1. The method of manufacturing an ultrasonic Doppler transducer, comprising:
    shaping support means to provide support for at least a pair of piezoelectric crystals in predetermined operative relation;
    preparing at least a pair of piezoelectric crystals to such size and shape to be capable of being held in said relation;
    covering said crystals on both faces thereof with an electrically conductive substance;
    affixing electrical contacts to each of said crystals on at least one of said coated faces;
    grounding the other of said coated faces to said support means;
    connecting shielded wires to said electrical contacts; and forming a common ground with said support means by immersing the shields on said shielded wires in an electrically conductive melt that has a melting point lower than the melting point of other elements of the transducer which come into contact with the melt, thereby isolating the electric circuit of one crystal from that of the other crystal.

2. The mehod of manufacturing an ultrasonic Doppler transducer as recited in claim 1 further including the steps of:
    insulating said one of the coated faces of said crystals; and
    affixing said crystals to said support means only at the edges of said crystals,
    whereby said crystals are free to vibrate in their thickness mode.

3. The method of manufacturing an ultrasonic Doppler transducer, including:
    shaping support means to hold at least a pair of piezoelectric crystals in predetermined operative relation;
    coating the faces of said pair of crystals for electrical conduction;
    connecting shielded electrical means to each of said crystals to provide coaxial transmission for said transducer; and
    immersing the shields of said electrical means in an electrically conductive melt to isolate the electric circuit of one crystal from that of the other crystal wherein the melting point of the melt is lower than the melting point of other elements of the transducer which come into contact with the melt.

4. The method of claim 3 including the step of insulating the crystals on the faces thereof where said electrical means are connected thereto.

References Cited

UNITED STATES PATENTS

| | | | |
|---|---|---|---|
| 2,754,238 | 7/1956 | Arenberg | 29—25.35 X |
| 2,795,709 | 6/1957 | Camp | 310—9.6 |
| 2,996,773 | 8/1961 | Summers | 164—109 X |
| 3,037,263 | 6/1962 | Wolfskill | 29—25.35 |
| 3,059,130 | 10/1962 | Robins | 310—8.2 X |
| 3,166,730 | 1/1965 | Brown et al. | 310—9.6 X |
| 3,239,696 | 3/1966 | Burkhalter et al. | 310—8.3 X |
| 3,302,044 | 1/1967 | Lynnworth et al. | 310—8.3 |
| 3,380,510 | 4/1968 | Jalbing et al. | 164—108 |

JOHN F. CAMPBELL, Primary Examiner

D. C. REILEY, Assistant Examiner

U.S. Cl. X.R.

164—108; 29—594, 595, 603